(12) United States Patent
Vreeken et al.

(10) Patent No.: US 9,358,878 B2
(45) Date of Patent: Jun. 7, 2016

(54) FLUID ENERGY REDUCING DEVICE

(75) Inventors: Steven Gerrit Vreeken, Grosse Pointe Farms, MI (US); Timothy James Nixon, Washington, MI (US)

(73) Assignee: TransNav Inc., New Baltimore, MI (US)

( * ) Notice: Subject to any disclaimer, the term of this patent is extended or adjusted under 35 U.S.C. 154(b) by 945 days.

(21) Appl. No.: 13/526,992

(22) Filed: Jun. 19, 2012

(65) Prior Publication Data

US 2013/0291985 A1 Nov. 7, 2013

Related U.S. Application Data

(60) Provisional application No. 61/643,013, filed on May 4, 2012.

(51) Int. Cl.
*B60K 15/07* (2006.01)
*B60P 3/22* (2006.01)
*B60K 15/077* (2006.01)

(52) U.S. Cl.
CPC .............. *B60K 15/077* (2013.01); *B60P 3/2235* (2013.01); *B60K 2015/0775* (2013.01)

(58) Field of Classification Search
CPC .................... B60K 15/077; B60K 2015/0775; B60P 3/2235
USPC ................... 137/574; 220/563, 508, 513, 501; 138/40, 44
See application file for complete search history.

(56) References Cited

U.S. PATENT DOCUMENTS

| | | | |
|---|---|---|---|
| 1,123,316 A * | 1/1915 | Kranz | 137/177 |
| 1,477,686 A | 12/1923 | Braender | |
| 3,474,971 A * | 10/1969 | Goodrich | 239/558 |
| 4,013,190 A | 3/1977 | Wiggins et al. | |
| 4,478,516 A * | 10/1984 | Kessler | 366/87 |
| 4,844,278 A | 7/1989 | Freiwald et al. | |
| 4,974,743 A | 12/1990 | Sasaki et al. | |

(Continued)

FOREIGN PATENT DOCUMENTS

| | | |
|---|---|---|
| EP | 1714820 A2 | 10/2006 |
| EP | 1990226 A1 | 11/2008 |

(Continued)

OTHER PUBLICATIONS

European Search Report for Application No. 13166531.7-1752 dated Aug. 9, 2013.

(Continued)

*Primary Examiner* — Craig Schneider
*Assistant Examiner* — Daphne M Barry
(74) *Attorney, Agent, or Firm* — Harness, Dickey & Pierce, P.L.C.

(57) ABSTRACT

A fluid energy reducing device includes a body having multiple, oppositely directed flow restrictors extending away from opposite sides of the body. Each flow restrictor can have a geometric shape such as a pyramid, triangle, or a conical shape. Fluid such as a fuel traveling in a wave entering the flow restrictors accelerates as the flow area in a flow passage of the flow restrictors decreases. The work performed by accelerating the fluid flow through one or more apertures created in each flow restrictor reduces the energy of the wave, thereby reducing noise in the fluid tank having the fluid energy reducing device when the reduced size and velocity wave subsequently strikes tank structure or walls.

24 Claims, 6 Drawing Sheets

(56) References Cited

U.S. PATENT DOCUMENTS

| | | | |
|---|---|---|---|
| 5,000,336 A * | 3/1991 | Gass | 220/88.1 |
| 5,002,467 A | 3/1991 | Talaski et al. | |
| 5,031,795 A | 7/1991 | Kotera et al. | |
| 5,163,573 A | 11/1992 | Kang | |
| 5,850,933 A | 12/1998 | Pazik | |
| 6,293,420 B1 | 9/2001 | Richter et al. | |
| 6,382,531 B1 * | 5/2002 | Tracy | 239/548 |
| 6,408,874 B1 | 6/2002 | Keller | |
| 6,408,979 B1 | 6/2002 | Forbes | |
| 6,543,426 B1 | 4/2003 | Schwochert | |
| 6,568,556 B1 | 5/2003 | Kahler, Jr. et al. | |
| 6,661,339 B2 | 12/2003 | Muirhead | |
| 6,761,150 B2 | 7/2004 | Zdroik | |
| 6,786,350 B2 | 9/2004 | Bauer | |
| 6,935,314 B2 | 8/2005 | Zdroik et al. | |
| 6,966,401 B2 | 11/2005 | Kojima | |
| 7,073,534 B2 * | 7/2006 | Sawchuk et al. | 138/39 |
| 7,261,323 B2 | 8/2007 | Grant | |
| 7,413,698 B2 * | 8/2008 | Bearse et al. | 264/511 |
| 7,445,082 B2 * | 11/2008 | Nakanii et al. | 181/198 |
| 7,648,749 B1 | 1/2010 | Taylor | |
| 7,819,272 B2 | 10/2010 | Sugiura | |
| 7,913,872 B2 | 3/2011 | Kang et al. | |
| 7,946,381 B2 * | 5/2011 | Fujii | 181/233 |
| 7,975,869 B2 | 7/2011 | Park | |
| 2001/0009257 A1 | 7/2001 | Bauer | |
| 2003/0015537 A1 | 1/2003 | Konja | |
| 2007/0160890 A1 | 7/2007 | Fischer | |
| 2009/0078705 A1 | 3/2009 | Ramsay | |
| 2011/0000921 A1 | 1/2011 | Hawks | |
| 2011/0139793 A1 | 6/2011 | Park | |
| 2011/0155743 A1 | 6/2011 | Jacob et al. | |

FOREIGN PATENT DOCUMENTS

| | | |
|---|---|---|
| EP | 1714820 A3 | 8/2011 |
| JP | 2007237843 A | 9/2007 |
| JP | 2009252427 A | 10/2009 |

OTHER PUBLICATIONS

English Translation of Chinese Office Action for Application No. 201310160890.8, dated May 26, 2015.

\* cited by examiner

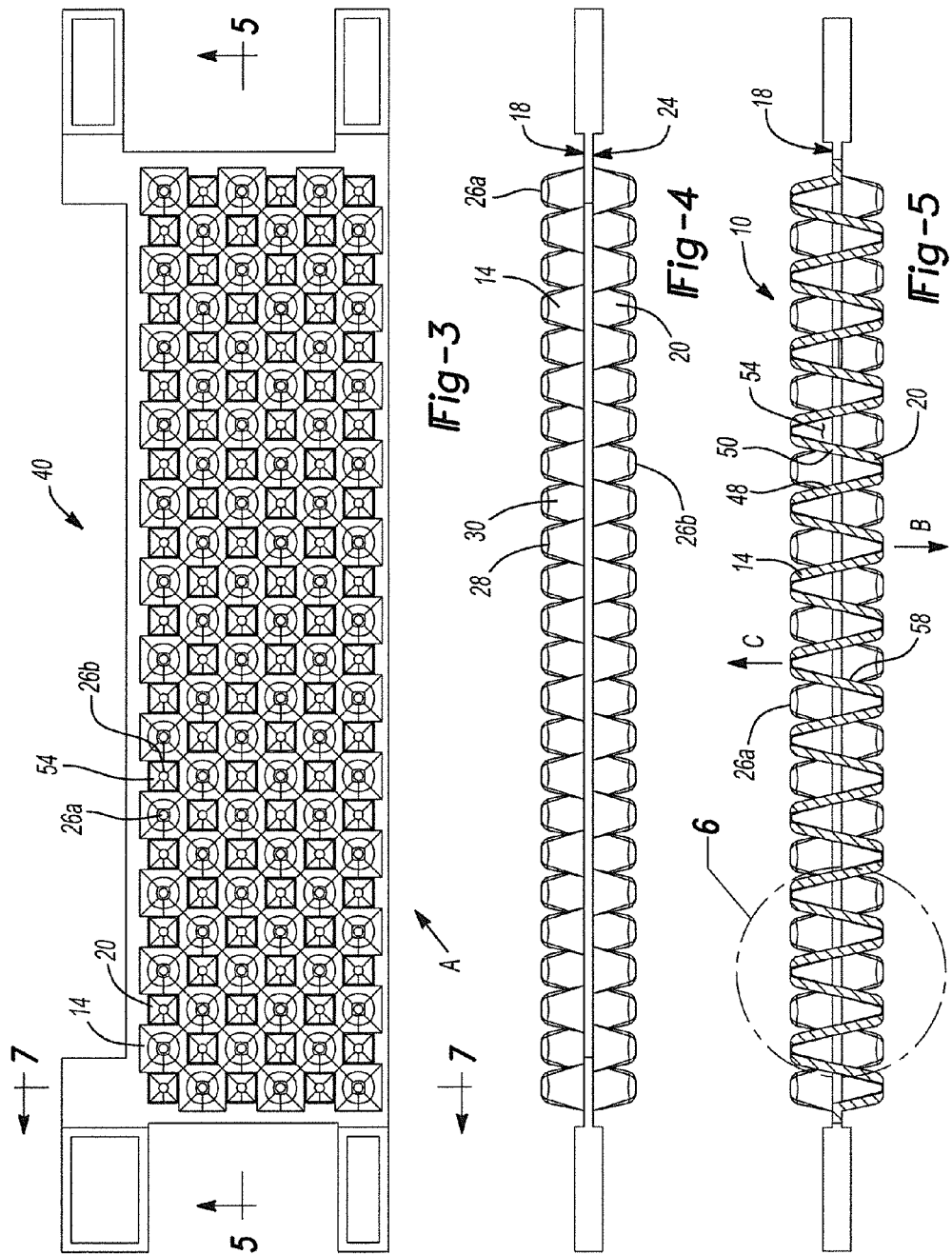

FLUID ENERGY REDUCING DEVICE

CROSS-REFERENCE TO RELATED APPLICATIONS

This application claims the benefit of U.S. Provisional Application No. 61/643,013, filed on May 4, 2012. The entire disclosure of the above application is incorporated herein by reference.

FIELD

The present disclosure relates to a fluid energy reducing device adapted for installation in a tank such as a fuel tank to dissipate the energy and therefore the noise created by waves of fluid moving in the fuel tank.

BACKGROUND

This section provides background information related to the present disclosure which is not necessarily prior art.

Vehicles including ships, aircraft and automobile vehicles have fluid tanks including fuel tanks that are often molded from a polymeric material which enables the fuel tank to be configured to suit the geometry of the vehicle frame and other components. Automobile fuel tank configurations commonly include non-geometric cavities, wings, and the like to maximize fuel volume in a limited space. During vehicle motion, a liquid fuel in the tank sloshes back and forth, creating waves. As each wave of fuel contacts a fuel tank end, side or cavity wall the wave energy creates high noise levels, which can reach approximately 100 decibels. This noise level can be sustained for 30 seconds or more until the waves dissipate. Multiple designs of internal tank baffles have been used to break up the fuel waves and therefore to reduce the noise levels.

Commonly known baffles for automobile vehicle fuel tanks provide a vertical wall which is normally positioned about midway in the fuel tank. Known baffles have through bores created in the vertical wall which each allow a portion of the fuel to move through the apertures, thereby changing the geometry of the sloshing waves in the fuel tank. Wave energy in common baffle designs is redirected, but not dissipated by flowing around the baffle, or through the baffle apertures. The energy of the waves is often redirected as smaller waves to other portions of the fuel tank where the tank geometry does not create as high a noise level when contacted by the redirected waves. Common baffle designs are therefore not effective at reducing total wave energy as a means to reduce noise.

SUMMARY

This section provides a general summary of the disclosure, and is not a comprehensive disclosure of its full scope or all of its features.

A fluid energy reducing device of the present disclosure includes a body having multiple, oppositely directed flow restrictors extending away from opposite sides of the body. Each flow restrictor can have a geometric shape such as a pyramid, triangle, or a conical shape. Fluid such as a fuel traveling in a wave entering the flow restrictors accelerates as the flow area in a flow passage of the flow restrictors decreases. The work performed by accelerating the fluid flow through one or more apertures created in each flow restrictor reduces the energy of the wave, thereby reducing noise in the fluid tank having the device when the reduced size and velocity wave subsequently strikes tank structure or walls.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a top plan view of the fluid energy reducing device of FIG. 1;

FIG. 4 is a front elevational view of the fluid energy reducing device of FIG. 1;

FIG. 5 is a cross sectional front elevational view taken at section 5 of FIG. 3;

Corresponding reference numerals indicate corresponding parts throughout the several views of the drawings.

DETAILED DESCRIPTION

Example embodiments will now be described more fully with reference to the accompanying drawings.

Figure 1:
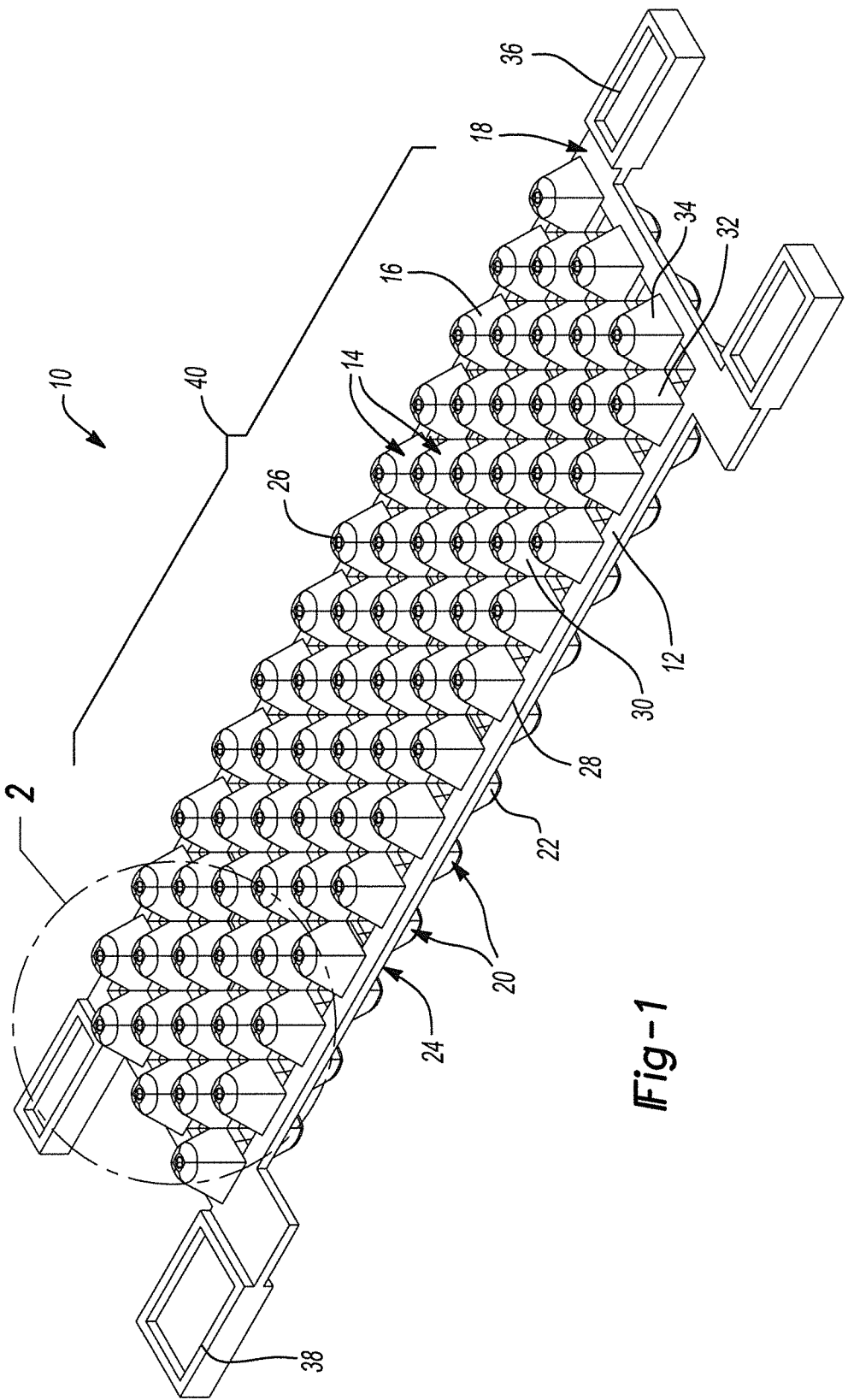
FIG. 1 is a front elevational perspective view of a fluid energy reducing device of the present disclosure.

Referring to FIG. 1, a fluid energy reducing device 10 includes a body 12 from which a plurality of first flow restrictors 14 each having a tapered body 16 extended upwardly away from a first body side 18 of body 12. A plurality of second flow restrictors 20 also each include a tapered body 22 which is similar to and according to several embodiments substantially identical to tapered body 16 of first flow restrictors 14. Each of the second flow restrictors 20 are oppositely directed with respect to first flow restrictors 14 and positioned on a second body side 24 of body 12. Each of the first and second flow restrictors 14, 20 includes a through aperture 26.

According to several aspects, the first and second flow restrictors 14, 20 can be configured in repeating rows and columns, for example a first row 28 positioned proximate to a second row 30 and a first column 32 positioned proximate to a second column 34. The number of rows and columns can be varied to suit the surface area required for fluid energy reducing device 10.

Body 12 can further include one or more connecting members 36 integrally connected to body 12 and providing contact locations for fixing body 12 with respect to a tank (not shown in this view). Body 12 can further include one mounting member 38 which is similarly configured as connecting members 36 but can include a size or surface area predetermined to suit the surface or mounting area required for a component such as a fuel pump (not shown). All of the combined first and second flow restrictors 14, 20 together define a flow restrictor field 40. The geometry, quantity, dimensions, and further attributes of the first and second flow restrictors 14, 20 defining flow restrictor field 40 can be varied to suit the requirements of fluid energy reducing device 10.

Referring to FIG. 2 and again to FIG. 1, according to several aspects the first and second flow restrictors 14, 20 are substantially mirror image configurations of each other and each includes multiple sides thereby defining a pyramid-shaped restrictor geometry. The pyramid-shaped flow restrictors each include a first side 42, a second side 44, a third side 46, and a fourth side 48. By positioning each of the flow restrictors in a side-by-side configuration, opposing ones of the sides of the flow restrictors together define flow channels for fluid to be directed through the flow channels and out through the various through apertures 26a, 26b. For example, fourth side 48 of flow restrictor 14a defines a first opposing side with respect to a second opposing side 50 of flow restrictor 14b. Similarly, a third opposing side 52 of flow restrictor 14c is oppositely oriented with respect to a fourth opposing side (not visible in this view) similar to third side 46.

The opposing sides of the proximate ones of the flow restrictors define a flow passage 54 through which fluid such as gasoline in a fuel tank can flow and be discharged via one of the through apertures 26a, 26b. Each of the flow passages 54 open with respect to first body side 18 of body 12. Similarly but oppositely directed, a plurality of flow passages 54a open with respect to second body side 24 of body 12. The plurality of flow passages 54, 54a therefore permit fluid flow starting from either the first or second body side 18, 24 of body 12 to be directed through fluid energy reducing device 10 and discharged on an opposite side. It is noted that fluid energy reducing device 10 can also be modified from the geometry shown in FIG. 2 to eliminate either the plurality of first or second flow restrictors 14, 20 such that the modified fluid energy reducing device 10 would include only first flow restrictors 14 or only second flow restrictors 20. In addition, any or all of the sides of the flow restrictors can include a surface feature 55 such as a wave pattern, surface roughness, or the like that reduces fluid velocity where the fluid is in contact with surface feature 55, thereby reducing the wave or fluid energy.

Figure 2:
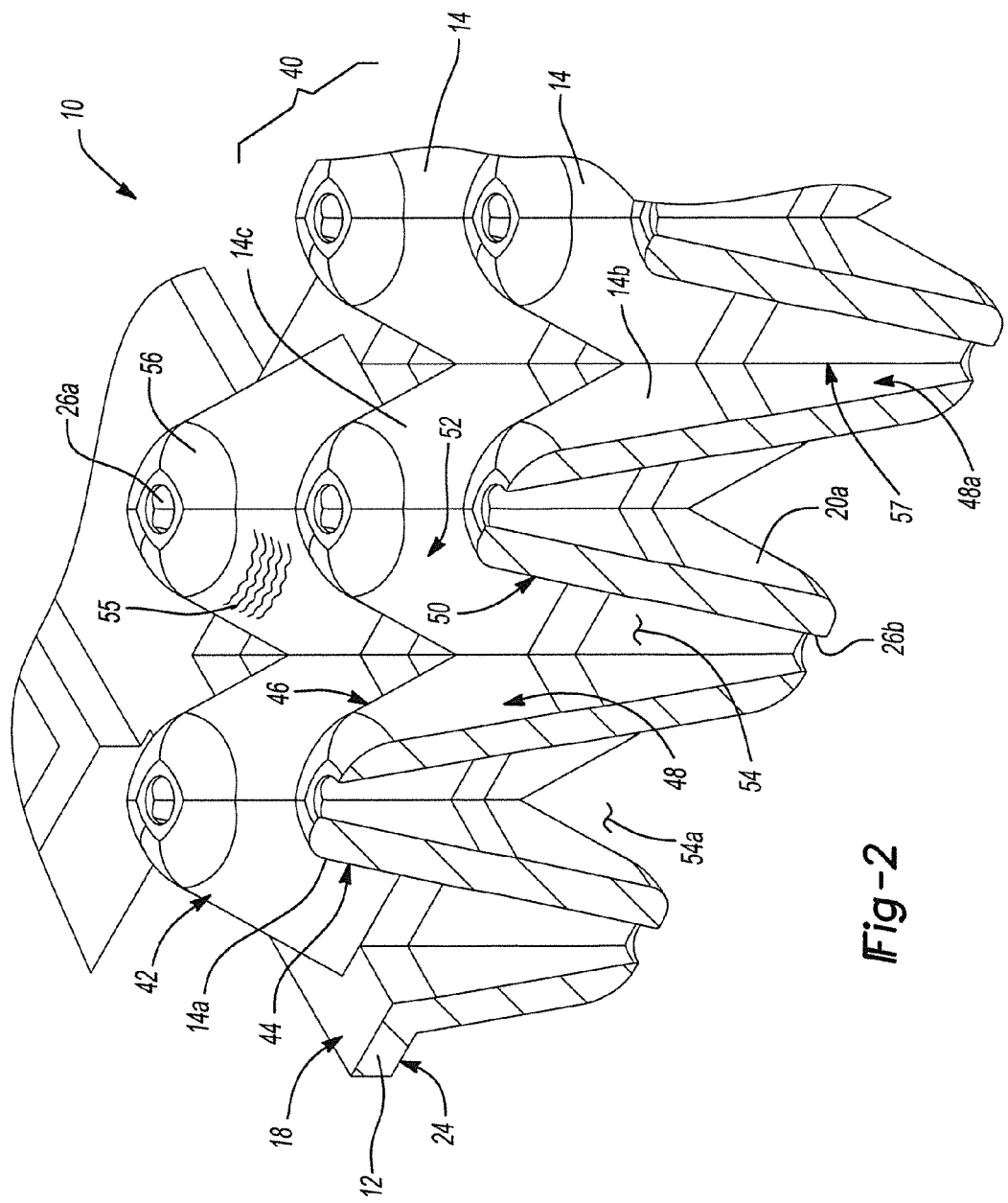
FIG. 2 is a front elevational perspective view of area 2 of FIG. 1.

Referring to FIG. 3 and again to FIGS. 1-2, as previously noted, the first and second flow restrictors 14, 20 are positioned in a side-by-side configuration defining flow restrictor field 40. This provides a proximate positioning of successive ones of through apertures 26a and through apertures 26b, thereby providing continuous transitions between the first and/or second flow restrictors, and precluding any portion of body 12 from being positioned between any of the first or second flow restrictors 14, 20. This ensures that fluid flow contacting body 12, for example in a wave direction "A" is entirely directed through either the through apertures 26a or through apertures 26b, with no flow contacting a planar portion of body 12 in between any of the flow restrictors.

Referring to FIG. 4 and again to FIGS. 1-3, an overlapping arrangement of the first flow restrictors 14 above first body side 18 ensures that fluid will contact each of the first flow restrictors 14 when received from the first body side 18. Similarly, the second flow restrictors 20 overlap each other with respect to their position on second body side 24 such that fluid flow received from the second body side contacts all of the second flow restrictors 20 and is forced to divert around either the first flow restrictors 14 and/or the second flow restrictors 20. This further slows down and therefore reduces the energy of the fluid contacting fluid energy reducing device 10 prior to being redirected into the flow passages and through apertures 26.

Referring to FIG. 5 and again to FIGS. 1-4, fluid entering each of the flow passages 54 exits the second flow restrictors 20 in a first discharge direction "B". Similarly, the fluid entering the plurality of flow passages 58 is discharged in an opposite second discharge direction "C" with respect to first flow restrictors 14. It should be evident that substantially all of the fluid approaching fluid energy reducing device 10 toward first body side 18 will be directed via flow passages 54 and discharged in first discharge direction "B". A portion of the flow approaching from this direction can also be received in the plurality of through apertures 26a, however the area of flow passages 54 is significantly greater than the flow area of through apertures 26a, therefore greater than half of the flow volume will enter flow passages 54.

Figure 6:
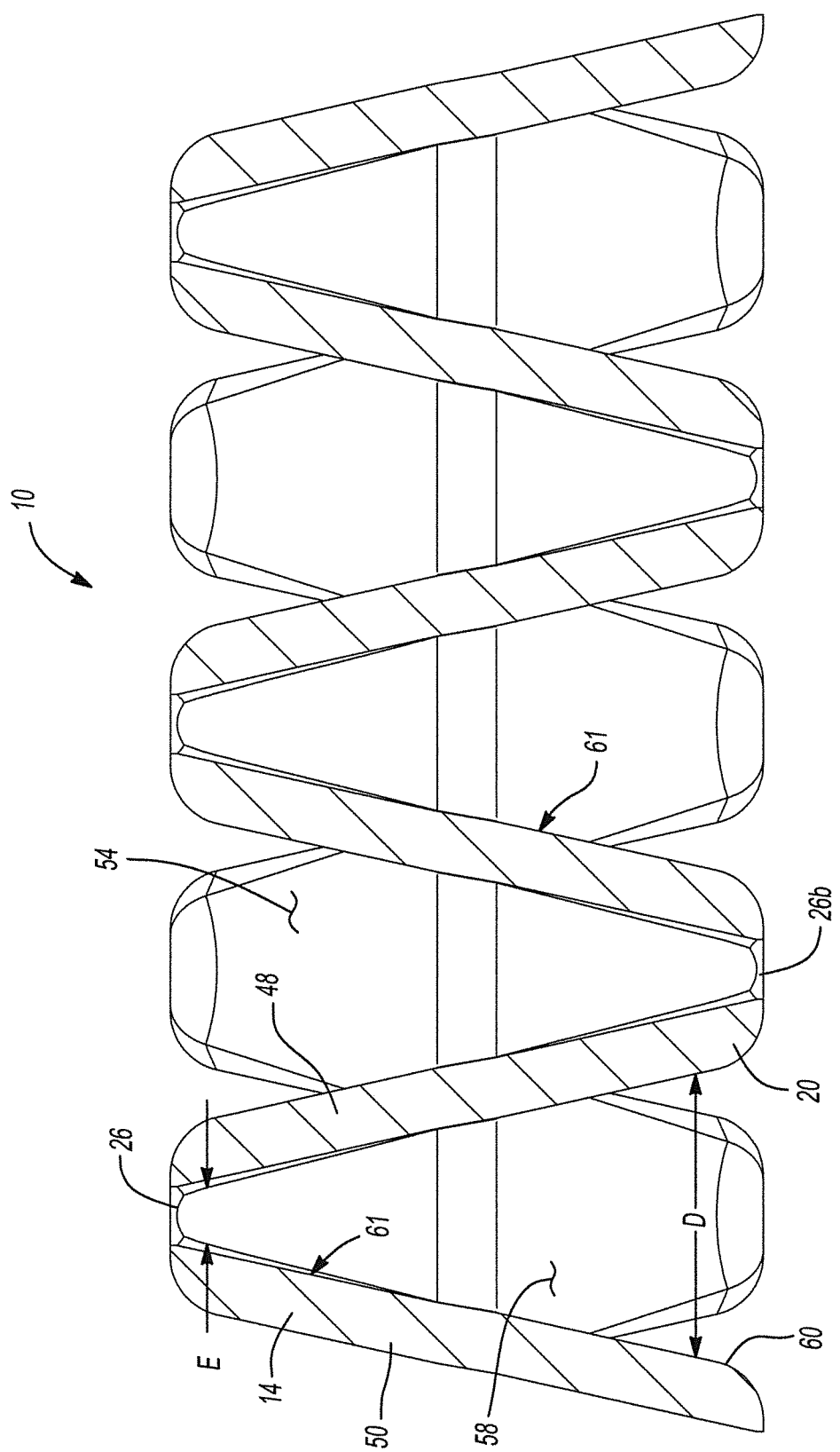
FIG. 6 is a cross sectional end elevational view taken at section 6 of FIG. 3.

Referring to FIG. 6 and again to FIGS. 1-5, the following discussion of flow passage 58 applies equally to flow passage 54. Flow passage 58 opens at an inlet 60 having an inlet diameter of dimension "D" having an area ($\pi \times D$) if for example flow passage 58 is circular, or an area of ($2 \times D$) if for example the flow passage is square. An inner wall 61 defined by the adjacent and connected sides of the flow restrictors defining flow passage 58 gradually tapers until a discharge diameter or area represented by dimension "E" defined by through aperture 26 is reached. This continuous reduction in flow passage diameter or area causes the fluid flowing into inlet 60 to accelerate prior to reaching through aperture 26 based on Bernoulli's law, thereby decreasing the pressure at through aperture 26 with respect to a pressure at inlet 60. This reduction in pressure and increase in flow velocity as fluid flows through flow passage 58 results in a net decrease in energy in the wave or fluid transitioning across fluid energy reducing device 10. The net energy decrease results from the work required to accelerate the flow of water through the various flow passages 58 and/or flow passages 54, plus the through apertures. It is noted that in the embodiment shown in FIG. 6, inner wall 61 defines substantially a flat or planar wall. This configuration of inner wall 61 can also be varied, for example, such that inner wall 61 can define any desired geometry including either a convex or a concave geometry.

Figure 7:
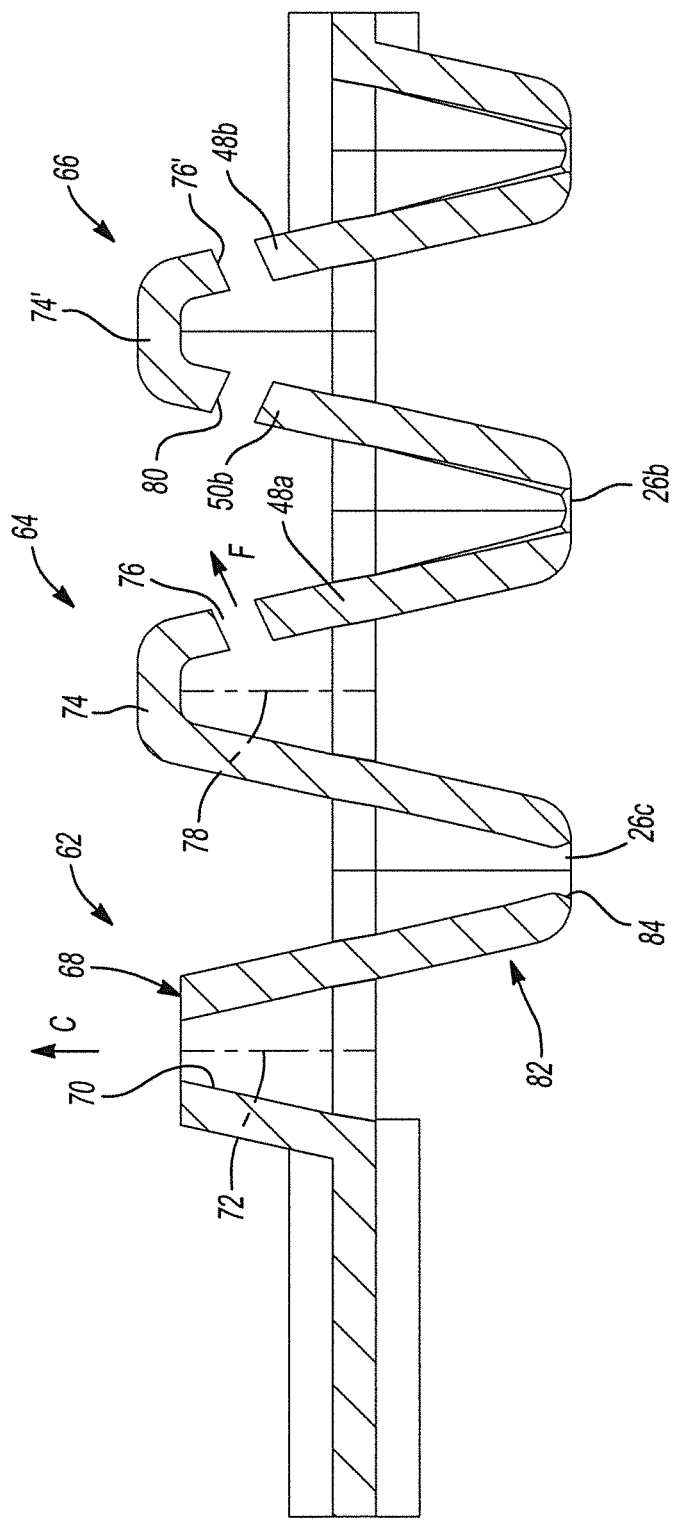
FIG. 7 is a cross sectional end elevational view similar to FIG. 6 showing alternate aspects of flow restrictors of the present disclosure.

Referring to FIG. 7 and again to FIGS. 1-6, according to additional aspects of the present disclosure the geometry and the location of the through apertures 26 in each of the first and second flow restrictors 14, 20 can be varied. Exemplary geometries are provided by the various aspects of flow restrictor 62, flow restrictor 64, and flow restrictor 66. Flow restrictor 62 includes a planar apex 68 in place of the curved apex previously described. A through aperture 70 extending through flow restrictor 62 therefore exits at a sharp edge defined by planar apex 68 in the second discharge direction "C". Planar apex 68 can be oriented substantially perpendicular with respect to a longitudinal axis 72 of flow restrictor 62. Planar apex 68 can also be angularly oriented with respect to longitudinal axis 72, thereby moving the direction of flow discharge away from second discharge direction "C".

Flow restrictor 64 includes a closed apex 74 thereby preventing discharge of fluid through closed apex 74 and forcing fluid through a side through aperture 76 created for example in fourth side 48a. Side through aperture 76 can be oriented at an angle with respect to a longitudinal axis 78 of flow restrictor 64. Using a discharge path such as side through aperture 76 further increases or decreases the energy loss compared to flow via through aperture 70. It is also noted that side through aperture 76 can be created in any of the four walls defining flow restrictor 64.

Flow restrictor 66 also includes a closed apex 74' similar to closed apex 74 of flow restrictor 64. Flow restrictor 66 is further modified to include both a side through aperture 76' and a second side through aperture 80. It is noted that side through aperture 76' and second side through aperture 80 can be positioned in any of the walls of flow restrictor 66. Additional through apertures can be created in any of the restrictor sides. A diameter of either or both of the side through aperture 76' and second side through aperture 80 can be equal or different with respect to the other through aperture.

A flow restrictor 82 is modified from first and second flow restrictors 14, 20 by modifying the geometry of a through aperture 26c. Through aperture 26c includes a divergent through aperture wall 84 to further modify the flow geometry exiting through aperture 26c.

With continuing reference to FIG. 7 and again to FIGS. 1-6 any of the flow restrictors can also be configured in a triangular shape or other geometric shape having five, six or more sides at the discretion of the designer. The flow restrictors can also be conical shaped having no opposing walls as previously described herein and therefore providing curved surfaces for directing fluid into the flow passages.

Figure 8:
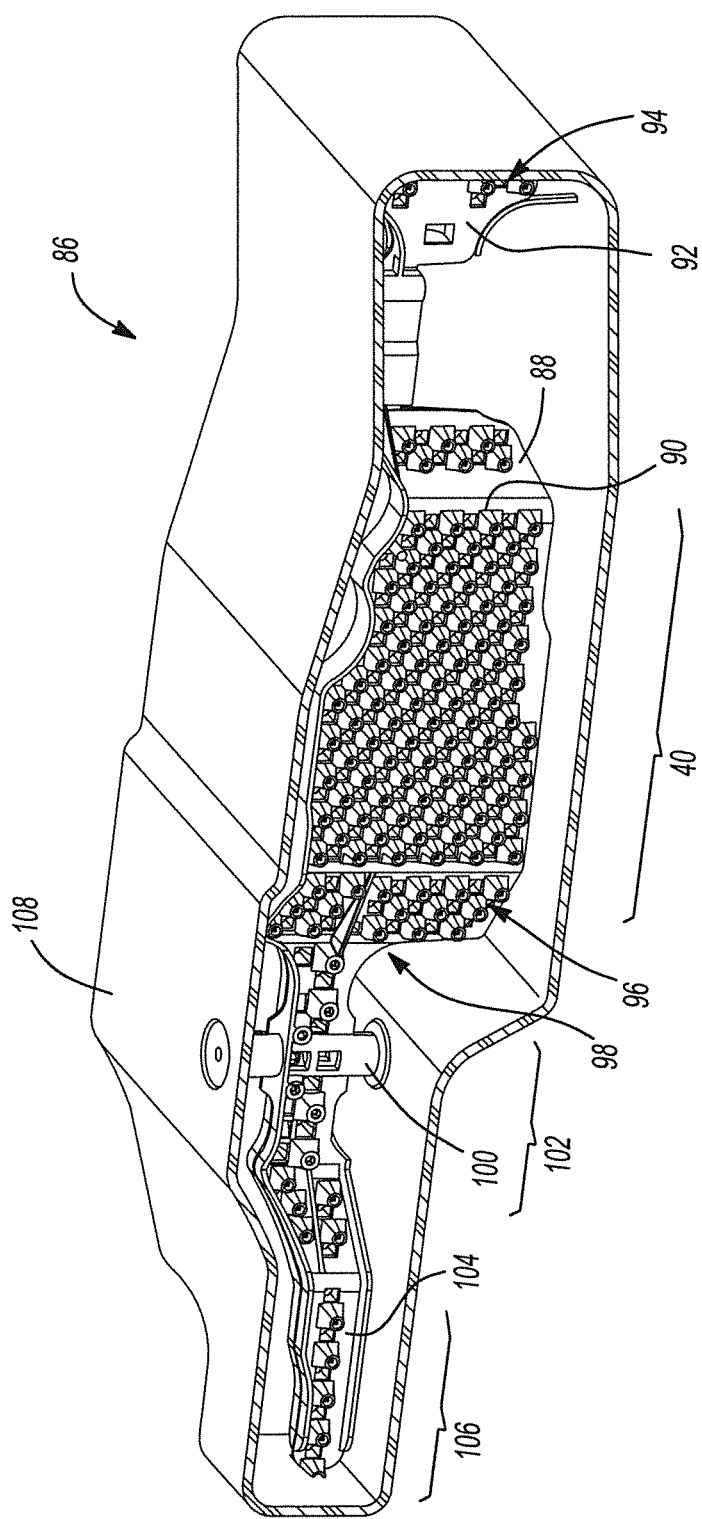
FIG. 8 is a front elevational perspective view of another aspect of a fluid energy reducing device of the present disclosure.

Referring to FIG. 8, a fluid energy reducing device 86 is representative of a complex geometry adapted for positioning fluid energy reducing device 86 in a fuel tank having multiple different internal cavities. Fluid energy reducing device 86 can include a fluid energy reducing device body 88 having a first body portion 90. First body portion 90 can include flow restrictor field 40 as previously described herein. In order to suit the geometric shape of the various other body portions of fluid energy reducing device 86, alternate concepts for arranging the flow restrictors can be provided. For example, a second body portion 92 can include a flow restrictor field 94 having different spacings or groupings of the flow restrictors to compared to flow restrictive field 40. Similarly, a third body portion 96 includes a flow restrictor field 98, a fourth body portion 100 includes a flow restrictor field 102, and a fifth body portion 104 includes a flow restrictor field 106. Any of the first, second, third, fourth, or fifth body portions 90, 92, 96, 100, 104 can include or omit flow restrictors or provide flow restrictors in alternate configurations. The design of fluid energy reducing device 86 therefore maximizes the surface areas of fluid energy reducing device body 88 having flow restrictors therein. As partially shown in FIG. 8, a fuel tank 108 made for example of a polymeric material blow-molded to a geometry with complex and multiple different cavities and/or wings can be accommodated by a fluid energy reducing device such as fluid energy reducing device 86, thereby maximizing the number of flow restrictors provided therewith. According to several aspects fluid energy reducing devices of the present disclosure, including fluid energy reducing devices 10 and 86, are made of a polymeric material which is injection molded to provide for the complex geometry of the flow restrictors of the present disclosure.

Fluid energy reducing devices of the present disclosure can be provided for multiple uses, and in multiple geometries. The through holes can be provided in alternate locations, providing flow is directed into and out of the flow restrictors. Fluid energy reducing device size and shape can vary according to tank geometry, but does not have to match the tank geometry. The flow restrictor dimensions can vary, including length and angular pitch. Fluid energy reducing devices of the present aspects can be used in any tank, container, or ballast containing a liquid to mitigate liquid sloshing energy and noise. Fluid energy reducing devices of the present disclosure can also be made in multiple materials including but not limited to plastic, steel, ceramic and others.

Fluid energy reducing devices of the present disclosure offer several advantages. By providing flow restrictors having decreasing area internal flow passages leading to a through or exit aperture, the energy of fluid waves traveling in a tank having a fluid energy reducing device of the present disclosure will be reduced by the work performed in forcing the fluid to flow through the flow restrictors and/or across the surface areas of the sides of the various flow restrictors. By positioning the various flow restrictors in side-by-side and row and column configurations, all of the flow contacting the areas having flow restrictors is forced through one of the apertures thereby decreasing the energy of the wave or flow as it passes through the fluid energy reducing device. Fluid energy reducing devices of the present disclosure can be provided as a single piece such that no additional mounting parts are required to be added to the fluid energy reducing device during or after construction. This eliminates the need for biasing members, metal clips, and/or rotatable connector members commonly used in the industry to install and position fluid energy reducing devices known in the art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid energy reducing device, comprising:
a body having multiple first flow restrictors projecting outwardly away from a first body side, and multiple second flow restrictors projecting outwardly away from a second body side, the second flow restrictors directed oppositely with respect to the first flow restrictors, each of the first and second flow restrictors including:
a tapered body having an inlet defining an inlet area; and
an aperture created in the body having a flow area, the inlet area being greater than the flow area of the aperture to increase a flow velocity of a fluid between the inlet and the aperture.

2. The fluid energy reducing device of claim 1, wherein the first and second flow restrictors of each of the first and second sides define pyramid shapes having walls that taper from the inlet to the aperture.

3. The fluid energy reducing device of claim 2, wherein the first and second flow restrictors of each of the first and second sides are arranged in a side-by-side configuration, whereby opposing ones of the walls of the flow restrictors together define a flow channel for the fluid to be directed through the flow channel and out via the aperture.

4. The fluid energy reducing device of claim 1, wherein the first and second flow restrictors of each of the first and second sides are configured in repeating rows and columns.

5. The fluid energy reducing device of claim 1, wherein:
opposing sides of proximate ones of the first flow restrictors define a flow passage through which the fluid can flow and be discharged via one of the through each aperture of the first flow restrictors, each flow passage of the first flow restrictors opening with respect to the first body side of the body; and
opposing sides of proximate ones of the second flow restrictors define a second flow passage through which the fluid can flow and be discharged via each aperture of the second flow restrictors, each flow passage of the second flow restrictors opening with respect to the second body side of the body;
the plurality of first and second flow passages permitting the fluid to flow starting from either the first or the second body side and directed through the fluid energy reducing device to be discharged on an opposite one of the first or second body sides.

6. The fluid energy reducing device of claim 1, wherein each of the first flow restrictors is positioned directly against one of the second flow restrictors having no planar portion of the body positioned in between any proximate ones of the flow restrictors, such that all of the fluid approaching from either the first body side or the second body side is directed through the apertures of both the first and second flow restrictors.

7. The fluid energy reducing device of claim 1, wherein each of the first and second flow restrictors includes a curved apex at the aperture, with the aperture coaxially aligned with a flow restrictor longitudinal axis.

8. The fluid energy reducing device of claim 1, wherein each of the first and second flow restrictors includes a planar apex at the aperture oriented perpendicular to a flow restrictor longitudinal axis.

9. The fluid energy reducing device of claim 1, wherein the aperture of any of the first or second flow restrictors extends through a flow restrictor wall and is oriented at an angle with respect to a flow restrictor longitudinal axis.

10. A fluid energy reducing device, comprising:
a body having multiple, oppositely directed flow restrictors projecting outwardly away from opposite sides of the body;
each of the flow restrictors having a geometric shaped flow passage reducing in a flow area between an entrance to an exit aperture;
wherein a fluid entering the flow restrictors accelerates as the flow area in the flow passage of the flow restrictors decreases thereby accelerating the fluid flow through the exit aperture created in each flow restrictor to reduce an energy of the fluid.

11. The fluid energy reducing device of claim 10, wherein the geometric shape is a pyramid having four sides.

12. The fluid energy reducing device of claim 11, wherein any or all of the sides of the flow restrictors includes a surface feature that reduces fluid velocity where the fluid is in contact with surface feature.

13. The fluid energy reducing device of claim 10, wherein successive ones of the flow restrictors of a first side of the body is positioned directly against one of the flow restrictors of a second side of the body having no planar portion of the body positioned in between any proximate ones of the flow restrictors, such that all of the fluid approaching from either the first body side or the second body side is directed through the apertures of the flow restrictors of the first side and the second side.

14. The fluid energy reducing device of claim 10, wherein the geometric shape is a cone.

15. The fluid energy reducing device of claim 10, wherein the flow passage includes at least one internal wall having a planar shape.

16. The fluid energy reducing device of claim 10, wherein the flow passage includes at least one internal wall having a convex shape.

17. The fluid energy reducing device of claim 10, wherein the flow passage includes at least one internal wall having a concave shape.

18. A fluid energy reducing device, comprising:
a polymeric body having multiple first flow restrictors projecting outwardly away from a first body side, and multiple second flow restrictors projecting outwardly away from a second body side, the second flow restrictors directed, oppositely with respect to the first flow restrictors, each of the first and second flow restrictors including:
a flow restrictor body having an inlet defining an inlet area; and
an aperture defining a flow area created in the flow restrictor body opposite to the inlet, such that the body defines a tapered internal passageway with the inlet area being greater than the flow area of the aperture;
all proximate ones of the first and second flow restrictors being positioned directly in contact with each other such that no portion of the body where the first and second flow restrictors directly contact each other is oriented perpendicular to a longitudinal axis of an internal passageway of any of the flow restrictors with respect to a fluid directed toward the body from either the first body side or an oppositely facing second body side,
wherein the body has a thickness and the first body side is on one side of the thickness and a second body side is opposite the thickness from the first body side.

19. The fluid energy reducing device of claim 18, wherein the polymeric body is incorporated inside a vehicle fuel tank.

20. The fluid energy reducing device of claim 19, wherein the polymeric body is shaped to correspond to an internal geometry of the fuel tank.

21. The fluid energy reducing device of claim 18, wherein the first and second flow restrictors of each of the first and second sides define pyramid shapes having four walls that taper toward each other as each flow restrictor extends from the inlet to the aperture.

22. A fluid energy reducing device, comprising:
a body;
multiple flow restrictors projecting outwardly away from a first body side, each of the flow restrictors including:
a taper shaped body having an inlet defining an inlet area;
an aperture created in the taper shaped body having a flow area, the inlet area being greater than the flow area of the aperture.
all proximate ones of the flow restrictors being positioned directly in contact with each other such that no portion of the body where the flow restrictors directly contact each other is oriented perpendicular to a longitudinal axis of an internal passageway of any of the flow restrictors with respect to a fluid directed toward the body from either the first body side or an oppositely facing second body side,
wherein the first body side is between the bad and the first flow restrictors and the second body side is between the body and the second flow restrictors.

23. The fluid energy reducing device of claim 22, wherein the flow restrictors define pyramid shapes having walls that taper from the inlet to the aperture.

24. The fluid energy reducing device of claim 22, wherein the flow restrictors are arranged in a side-by-side configuration, whereby opposing ones of a plurality of sides of the flow restrictors together define a flow channel for fluid to be directed through the flow channel and out via the aperture.

* * * * *